United States Patent Office 3,385,837
Patented May 28, 1968

3,385,837
POLY(OXATHIAHYDRAZIDES)
Walter Patrick Fitzgerald, Jr., New Castle, and August Henry Frazer, Wilmington, Del., assignors to E. I. du Pont de Nemours and Company, Wilmington, Del., a corporation of Delaware
No Drawing. Filed July 15, 1965, Ser. No. 472,297
19 Claims. (Cl. 260—79)

ABSTRACT OF THE DISCLOSURE

Pyridine-soluble poly(oxathiahydrazides) formed by heating a mixture of $P_2S_5$, pyridine and a polyhydrazide. Heating must be at a temperature of at least 100° C. for less than 40 minutes. Solutions of the products can be spun to produce fibers or cast to produce films; heat treatment of these provides fibers and films of poly(1,3,4-thiadiazoles).

INTRODUCTION

This invention relates to novel materials comprising film- and fiber-forming poly(oxathiahydrazide) polymers and to various products formed thereof. In particular it relates to poly(oxathiahydrazide) polymers in a form which is characterized by improved solubility properties.

Numerous patents describe the preparation of polyhydrazides which, upon ring closure, can be converted to the corrsponding high-melting oxadiazole polymers. Since the latter are normally infusible and, further, cannot be dissolved in solvents which are of practical utility, shaped articles such as films and fibers are first formed of the polyhydrazide followed by conversion thereof to the oxadiazole polymer. The correspoding sulfur-containing analogues are also known, i.e., the polyoxathiahydrazides and polythiadiazoles, and have the added advantage that ring closure is more easily facilitated to give the final high melting product.

While the polythiadiazoles are well suited to the fabrication of films and fibers for a wide variety of applications where high temperature stability is required, nevertheless processes leading thereto have not been readily amenable to commercial operation. Particularly in the manufacture of fibers by wet or dry spinning techniques, the polyoxathiahydrazides have lacked sufficient solubility in solvents of practical utility at the low temperatures required to prevent premature conversion.

STATEMENT OF THE INVENTION

In accordance with the invention, high molecular weight polyoxathiahydrazides are provided in a novel form which is characterized by substantial solubility in one or more common solvents such as pyridine, usually dissolving to the extent 10 to 65% by weight or more even at temperatures as low as 30° C. More specifically, there is provided a polymeric complex of $P_2S_5$, pyridine and a polyoxathiahydrazide of the formula

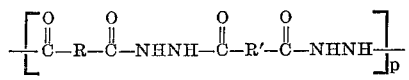

wherein,
R and R' are selected from the group consisting of a covalent bond and organic radicals of 1 to about 20 carbon atoms,
Y is selected from the group consisting of oxygen and sulfur, the number of each along the polymer chain being essentially equal, and
m is a number sufficiently large to provide an inherent viscosity in methanesulfonic acid at 30° C. of at least 0.1, said polymeric complex being capable of being cast as a film from pyridine solution.

The term "polymeric complex" as used above will be further understood from the description of the invention which follows. It is to be noted initially, however, that while a precise chemical structure cannot be assigned to the soluble reaction product of $P_2S_5$, pyridine and the polyhydrazide, yet the existence of a unique polymeric complex can be confirmed experimentally, e.g., by spectral and thermogravimetric analyses using for comparison polyoxathiahydrazides prepared by direct condensation methods.

The novel pyridine-soluble polyoxathiahydrazides, described above, are produced in accordance with the invention by heating to a temperature of at least 100° C. a mixture of $P_2S_5$, a solvent comprising at least 90% by weight of pyridine, and a polyhydrazide of the formula

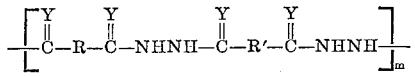

wherein,
R and R' are as defined above, and
p is a number sufficiently large to provide an inherent viscosity in dimethyl sulfoxide at 30° C. of at least 0.2; the duration of said heating being such that said mixture is exposed to temperatures of 100° C. or more for no longer than about 40 minutes, and thereafter recovering the polyoxathiahydrazide thusly formed.

ADVANTAGES

A primary advantage of the invention is that it enables the provision of solutions of polyoxathiahydrazides in common fiber-spinning and film-casting solvents. Moreover, these solutions can be prepared with a high degree of stability because they can be formed at low temperatures to avoid premature conversion to the polythiadiazole. A further advantage of the invention is that the polyoxathiahydrazides are formed by the sulfurization of polyhydrazides which in turn are prepared from conventional dicarboxylic acids. Direct condensation of a polyoxathiahydrazide, on the other hand, requires the less common and more expensive thio-derivatives of the acids. Still a further advantage of the invention is that shaped articles of polythiadiazoles formed of the polymeric complex can be prepared which exhibit superior physical properties as compared to those in which the polymeric complex was not used, i.e., where the polyoxathiahydrazide intermediate is formed by direct condensation procedures. In the case of dry- or wet-spun filaments, for example, superior values of tenacity can be readily obtained.

PROCESS DESCRIPTION

The polyhydrazide starting materials specified above as being employed in accordance with the invention are described in, for example U.S. Patents 2,615,862; 3,130,182; 3,130,183; and in J. Polymer Sci.; Part A, 2, 1137–56 (1964). The specific identity of the R and R' radicals thereof is not of critical importance provided that the number of carbon atoms in each does not exceed about 20. Typically suitable radicals which R and R' may represent are a simple carbon-to-carbon or covalent bond; divalent aliphatic, aryl and alkyl radicals containing from about 1 to about 20 carbon atoms and which may be hydrocarbon or may be substituted with halogen or monovalent lower alkyl radicals or contain ether or thioether linkages; and heterocyclic radicals containing nitrogen, sulfur and/or oxygen. Thus, polyhydrazides which are useful in the practice of this invention are prepared from dicarboxylic acid chlorides and dicarboxylic acid hydrazides obtained from such acids as the following: oxalic, malonic succinic, glutaric, adipic, pimelic, suberic, azelaic, sebacic, brassylic, α,ω-eicosandicarboxylic, biphenyl-4,4'-dicarboxylic, bis(4 - carboxyphenyl)sulfone, bis(4-carboxyphenyl)ether, 1,4-cyclohexane dicarboxylic, 1,3-cyclohexane dicarboxylic, isophthalic, terepthalic, 2,5-dichloroterephthalic, diphenic, naphthalene - 1,4 - dicarboxylic naphthalene-2,6-dicarboxylic, pyridine-2,6-dicarboxylic, pyridine-2,5-dicarboxylic, pyridine - 3,5 - dicarboxylic, pyrazine-2,5-dicarboxlic, thiophene-2,5-dicarboxylic, pyrrole-2,5-dicarboxylic, furan-2,5-dicarboxylic, and quinoline-2,6-dicarboxylic acids. The specific aromatic acids above mentioned may also bear other substituents such as lower alkyl groups, aryl groups, halogen atoms, ether linkages, thioether linkages and other similar non-reactive substituents on the aromatic nuclei. Useful dicarboxylic acids of these types are those identified in U.S. 3,130,182 column 3, lines 65–75, and column 4, line 1. Polyhydrazides which are also useful in the process of this invention are those prepared from the diacid chlorides of aliphatic-aromatic dibasic acids, such as meta- or para-phenylene diacetic acid, meta- or para-phenylene dipropionic acid, and other homologous members of this series.

It will be apparent to those skilled in the condensation polymer art that in addition to being homopolymers, the polyhydrazide reactants described above may be random copolymers or may be highly ordered copolymers, depending upon the choice and manner in which two or more dicarboxylic acid chlorides are employed for the synthesis thereof. Thus R and R' may be the same or different and the reactants from which each of these moieties are derived may also be mixtures of two or more dicarboxylic acid chlorides.

The use of aromatic dicarboxylic acids is preferred for the reason that, in general, they give higher melting polymers. Polyhydrazides which are especially preferred for use in this invention include those prepared from isophthalic acid and terephthalic acids, such as poly(isophthaloylhydrazide), poly(tertphthaloylhydrazide), poly(iso/terephthaloylhydrazide) (50/50), and carbocyclic and heterocyclic copolyhydrazides containing at least about 50 mole percent of isophthaloylhydrazide units.

The sulfurization of the polyhydrazides described above to the corresponding polyoxathiahydrazide analogs is effected by first reacting the polyhydrazide with excess phosphorus pentasulfide in a pyridine medium, preferably under reflux in a nitrogen or other inert gas atmosphere. The exothermic heat generated by mixing these materials in conjunction with external heat supplied thereto should be sufficient to raise the temperature to at least 100° C., and preferably to reflux temperature to commence the sulfurization reaction. Although the reaction is ordinarily performed at atmospheric pressures, superatmospheric pressures may be used.

Once the reaction mixture has attained a temperature of 100° C. or above, the heating at that temperature should be continued for not in excess of about 40 minutes, usually a heating period of 1 to 35 minutes is preferred. Although the reasons are not fully understood it has been found that excessive exposure at the elevated temperatures will diminish the solubility of the polymeric complex which is formed. This will be demonstrated in the specific examples which follow.

The sulfurization reaction is performed in a solvent at least 90% by weight of which is pyridine. Small amounts of water, frequently carried as water of equilibrium with the polyhydrazide, actually facilitate the reaction and are preferred. Other generally inert liquids such as hexamethylphosphoramide may also be included. When used in a similar fashion various solvents other than pyridine, even closely analogous ones, do not yield products of sufficient solubility in pyridine or other spinning or casting solvents of practical utility to enable the preparation of satisfactory fibers or films. Thus when phosphorus pentasulfide and poly(isophthaloyl/terephthaloylhydrazide) (50/50) are reacted at reflux in piperidine or α-picoline and the products separated in the usual manner, there are obtained high melting products whose infrared spectra indicate the presence of thiocarbonyl groups, but which are not sufficiently soluble in pyridine and/or N,N-dimethylacetamide to permit the preparation of fibers and films. When quinoline is employed in an attempted sulfurization-complexation reaction, run at 160°–170° C. for a total time of 30 minutes, the product contains only a small amount of the desired polyoxathiahydrazide and is not soluble in pyridine. These comparisons, coupled with spectral and other evidence of pyridine in the soluble reaction product prepared according to the invention, confirm the existence of a form of polymeric complex.

While the sulfurization reaction for providing soluble complexed polyoxythiahydrazide products must be performed within certain time limits as above-described, other process features can be varied considerably. According to one procedure, the polyhydrazide, phosphorus pentasulfide, and pyridine are mixed at room temperature in any suitable apparatus equipped for reflux and vigorous stirring, and the resulting solution heated from the autogenous temperature of mixing to between 100° C. and reflux temperature. Alternately the reactants may be preheated, mixed together in suitable apparatus, and then maintained at an elevated temperature. In any case, the time at which the reactants are exposed to temperatures of 100° or more should not exceed about 40 minutes if a suitably soluble product is to be obtained. It has been generally observed that little sulfurization-complexation occurs at reaction temperatures below 100° C.

A 3 to 15-fold molar excess of phosphorus pentasulfide (basis: 1 molecule of $P_2S_5$ theoretically being able to replace 5 carbonylic oxygens of the polyhydrazide with sulfur) is usually employed for preparation of a complexed polyoxythiahydrazide from its appropriate polyhydrazide precursor according to the process of this invention. In general lesser amounts of phosphorus pentasulfide, for example as low as a 1.7-fold excess, have been found to give either a product which is insoluble or whose solutions do not subsequently process well. However, a large excess of the sulfurizing agent is not deleterious to the process. For example, use of a 9-fold excess of phosphorus pentasulfide gives complexed polyoxythiahydrazide polymers which can be spun to good fibers and use of a 12-fold excess permits similar results.

After the sulfurization reaction has been terminated, the pyridine-soluble polymeric complex is separated from the excess phosphorus pentasulfide and other undesired residues prior to preparing filaments, films, or other shaped articles therefrom, Thus, the hot reaction mixture may be cooled to ambient temperatures to effect precipitation of the desired polymeric complex together with certain other residues. This impure product is collected by filtration or centrifugation and freed from excess pyridine and phosphorus pentasulfide derivatives prior to drying. According to one method, this is accomplished by digesting a mixture of the collected solids in water (in approximate relative amounts of 200 g. solids per 1,000 g. $H_2O$) on a steam bath. Prolonged exposure to high temperatures is to be avoided, however, as the pyridine-solubility of the polymeric complex may be impaired. Digestion conditions found to be suitable are 15 minutes at 90° C.–100° C., or for 1 hour at 80°–90° C., or for 3 hours at 60–70° C. or for 6 hours at 40°–45° C. It will be understood that the reaction mixture is quite stable at low temperatures, e.g., it may frequently be permitted to stand for as long as about 96 hours or more at 30° C. prior to removal and digestion of the reaction products.

Following the digestion process, the polymeric complex is isolated by filtration, centrifugation, or other means and is washed well with hot water, for example, by being homogenized in a blender if the polymer is in the form of highly cohesive aggregates. The polymer is then recovered, washed further with water, and is desired, with separate quantities of one or more fluids such as methanol, acetone, benzene, and ether, and is dried. The washed product is usually dried in air for several hours at ambient temperatures and can, if desired, be further dried for a short period in a vacuum oven at temperatures not exceeding 110° C. The washed and dried complexed polyoxythiahydrazide polymer is stable at room temperature for many hours without substantial loss of its high solubility properties. It may be stored in the dry state or in solution form prior to preparation of shaped articles therefrom.

The polymeric complexes of the invention may be dissolved in pyridine or certain other solvents for the preparation of shaped articles. Pyridine is greatly preferred since solutions can be prepared to contain at least 10% and usually as high as 40 to 65% by weight or more of the polymeric complex even at room temperature. Filaments may be prepared from these solutions by conventional wet- or dry-spinning procedures. Similarly, films may be cast therefrom by conventional casting techniques. In general, solvents such as N,N-dimethylformamide, N,N-dimethylacetamide, hexamethylphosphoramide, methanesulfonic acid, and N-methylpyrrolidone can also be used to dissolve the polymeric complex, although for purposes of spinning filaments these solutions may not be as satisfactory as ones formed of pyridine.

The polymeric complexes of the invention are converted to the corresponding polythiadiazoles by heat. The latter comprise polymers of the formula

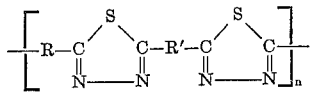

wherein R and R' have the significance set forth hereinbefore and $n$ is a number sufficiently large to provide a polymer having an inherent viscosity in methanesulfonic acid at 30° C. of at least 0.1. In the heating process, oxygen atoms from the carbonyl radicals of the polyoxathiahydrazide are preferentially split out along with hydrogen atoms, as is known. One procedure which provides polymers of the above formula comprises gradually heating over a period of approximately 3 hours a quantity of a poly(oxathiahydrazide) polymeric complex, the latter being either in granular, fiber, film, or other shaped form. The heating may be performed either in an inert atmosphere or under high vacuum and at temperatures within the range of from about 100° C. to about 250–350° C., with the material generally being kept at the upper temperature for at least 30 minutes. Alternatively, the heating may be accomplished by placing a suitable vessel containing the poly(oxathiahydrazide) sample into an oil bath or heat chamber which has been pre-heated to a temperature within the range of about 250° C.–350° C. so as to isothermally heat the sample therein for a period of from about 30 minutes to about 72 hours.

In general, the polythiadiazoles in which R and R' are arylene may be named as poly(arylene 1,3,4-thiadiazol-2,5-ylene arylene 1,3,4-thiadiazol-2,5-ylene) polymers. Similar nomenclature may be used where one or both of R and R' are other than arylene. If R and R' represent m-phenylene and p-phenylene radicals, respectively, the polymer would be named as poly(m-phenylene 1,3,4-thiadiazol-2,5-ylene p-phenylene 1,3,4-thiadiazol-2,5-ylene). Herein, however, the name of the latter polymer will be shortened to poly(m/p-phenylene 1,3,4-thiadiazole).

FIBER PREPARATION

In the manufacture of polythiadiazole fibers (the latter term as used herein being inclusive of monofilaments, yarns and other fibrous products), widely varying combinations of processing steps can be used subsequent to that of spinning the polymeric complex. As would be expected, the fiber properties which can be attained will in part depend upon the particular identity of the R and R' radicals of the polyoxathiahydrazide and can be varied depending upon the use intended for the fibers. In general, however, it is possible to obtain polythiadiazole fibers having superior properties, e.g., tenacity, as compared to those obtained from a polyhydrazide prepared by direct condensation procedures. The explanation for this resides in the ability to spin the polymeric complex under less drastic temperature conditions so as to minimize the likelihood of any premature conversion to 1,3,4-thiadiazole radicals.

In general, it has been found that polythiadiazole fibers having the highest tensile properties are obtained when fibers of the polymeric complex are first drawn and at least partially decomplexed before conversion. For example in the preparation of poly(m/p-phenylene-1,3,4-thiadioazole) fibers of the corresponding polymeric complex are first simultaneously drawn and partially decomplexed at elevated temperatures up to 200° C. Thereafter conversion, with or without further drawing, is performed at higher temperatures, for example up to 450° C. Decomplexing is continued by this additional thermal treatment and is assisted by occasionally immersing the fibers in a liquid bath, e.g., water or pyridine, maintained at 80° C. to 115° C. for periods of up to 48 hours. The latter treatment, which may be performed on the as-extruded filaments prior to any thermal treatments, if desired, serves to decomplex the polymer. Stronger fibers are obtained by multiple drawing operations to obtain the over-all draw ratio which is desired.

In any case, the most highly drawn fibers are usually the strongest. Total draw ratios of from about 2× to about 6× are ordinarily utilized for preparing the poly (m/p-phenylene-1,3,4-thiadiazole) yarns, with ratios of 7× or even higher having been utilized in certain instances. Heating skeins of drawn poly(m/p-phenylene-1,3,4-thiadiazole) yarns at temperatures of not over about 300° C. also imparts favorable tensile properties to the yarns.

Stable, strong fibers of poly(m/p-phenylene-1,3,4-thiadiazole) are most advantageously obtained by initially drawing as-extruded fibers of the polymeric complex about 1.1× to 2× over a hot plate maintained from 150° C. to 250° C., a unit section of the fiber having a residence time of about 5 seconds (i.e., drawing "on-the-run"). The drawn fibers are then further drawn, converted, and decomplexed in a series of multiple draw-conversion steps performed at about 250° C., after which additional drawing of the fully-converted poly(m/p-phenylene-1,3,4-thiadiazole) fiber is performed within the temperature range of about 275° C. to 300° C.; the total draw imparted by this sequence of steps preferably being about 2× to 6×. Direct drawing of the as-extruded complexed poly(iso/terephthaloyloxathiahydrazide) filaments at temperatures of 300° C.–375° C., temperatures whereat cyclodehydration to the polythiadiazole occurs, tends to produce brittle and fused fibers, possibly due to the loss of fine structure as a result of excessively rapid thermal conversion. Thus, intial drawing-converting steps at lower temperatures are desirable in order to provide greater flexibility in subsequent high temperature drawing steps.

The thermal stability of poly(m/p-phenylene-1,3,4-thiadiazole) fibers which have been subjected to multiple drawing-converting operations is excellent. For example a skein of this fiber, the as-extruded polymeric complex having been drawn 4×, retains 92% of its straight tenacity, i.e., tenacity measured longitudinally, when exposed in air at 300° C. for 144 hours. Another fiber of this polymer, having been first drawn 4.2× at 250° C. and annealed for an additional hour at 245° C. in air, retains about 60% of its initial straight tenacity value when annealed in skein form at 400° C. under nitrogen for 24 hours. Comparable results are observed when skeins are annealed at lower temperatures for longer times or when unannealed skeins are placed directly into a pre-heated oven at 400° C. Poly(m/p-phenylene-1,3,4-thiadiazole) fibers produced by the processes of this invention are found to resist degradation when immersed in boiling 10% sulfuric acid or boiling 10% caustic solution for 24 hours.

The above provides specific processing conditions leading to the poly(m/p-phenylene-1,3,4-thiadiazole) fibers and described typical fiber properties that can be obtained. It will be apparent that other polymeric complexes, e.g., of other polyoxathiahydrazides, can be similarly processed to also obtain fibers of highly useful properties.

THE POLYMERIC COMPLEX

As indicated above, a precise chemical structure cannot be ascribed to the polymeric complex of $P_2S_5$, pyridine and the polyoxathiahydrazide of the formula

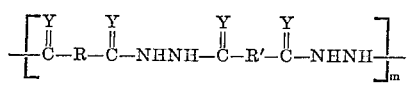

wherein R, R' and Y and m are as previously defined. Nevertheless the existence of this complex can be ascertained by analytical techniques using, for comparison, polyoxathiahydrazides prepared by condensation procedures. This will be further understood from the discussion hereinafter.

In the specific examples which follow, portions thereof describe the preparation of the various polyoxathiahydrazides by direct condensation procedures, not by the sulfurization process of the present invention. Because of the manner in which they are prepared, these polyoxathiahydrazides will be composed of recurring units of a known structure. Spectrally, as well as by other tests and analyses, these can then be compared to polyoxathiahydrazide complexes which illustrate the practice of the invention.

Characterization of the novel polymeric complex of the invention will be best understood by reference to Parts A and D of Example I which follows. These represent sulfurization and direct condensation procedures, respectively, leading to a poly(isophthaloyloxathiahydrazide). First of all it is significant to note that the polymer of Example I–D is essentially insoluble in pyridine whereas that of Example I–A can be formed, at room temperature into a pyridine spinning solution of high solids content. Infrared absorption bands of the two polymers, on the other hand, compare very closely and, since it is the various radicals of the polyoxathiahydrazide polymer molecule which create these, it is clear that both have the same polymer chain or backbone. An ultraviolet spectrum of the polymer of Example I–A reveals the presence of pyridine in the polymeric complex by virtue of the characteristic absorption bands at 250 mμ. Had the pyridine not been present in the form of a complex, it would have been removed in the digestion procedure. The polymer of Example I–D does not, of course, exhibit the U.V. absorption bands which are characteristic of pyridine.

The U.V. spectrum of the product of Example I reveals a further absorption band which, since it is not characteristic of any of the initial reactants, is attributed to the polymeric complex itself. In particular, this product will be seen to have a $\lambda_{max}$ at 324 mμ versus methanesulfonic acid. Inasmuch as this product exhibits negligible fluoresence, it can be assumed that little or no conversion to the highly fluorescent 1,3,4-thiadiazole radicals has occurred.

The presence of $P_2S_5$ per se in the polymeric complex cannot be directly established although the existence of some derivative form thereof is revealed by the characteristic $\lambda_{max}$ in the U.V. spectrum. Elemental analyses by microcombustion techniques are not satisfactory for this purpose. It is significant to note that refluxing of pyridine and $P_2S_5$ alone, i.e., without the polyhydrazide, produces a soluble reaction product which, upon cooling the solution, can be isolated as a crystalline complex having a melting point of 140° C. and a complex infrared spectrum.

Thermogravimetric analysis (TGA) data as reported in the examples which follow also confirm the structure of the polyoxathiahydrazide portion of the polymeric complex. Thus a polyoxathiahydrazide, whether sulfurized by the process of the invention to form a polymeric complex or prepared by direct condensation procedures, when heated at a programmed rate of temperature rise will undergo a first marked increase in rate of weight loss as cyclodehydration to the polythiadiazole occurs and a second marked increase in rate of weight loss as decomposition of the polythiadiazole occurs. These rates of weight loss are graphically plotted in the conventional manner to form a pair of curves, each having a major deflection defined by its initial and final shoulders. The temperatures at which these shoulders occur are reported as $(T_i/T_f)_1$ for the first curve and as $(T_i/T_f)_2$ for the second curve. As will be apparent from the examples, the $(T_i/T_f)_1$ and $(T_i/T_f)_2$ values for a polymeric complex of the invention will compare closely with the values obtained from a polyoxathiahydrazide prepared by condensation procedures. From these data, it is therefore established that the polymeric complex is composed of recurring units of a polyhydrazide, as defined above, having approximately equal numbers of

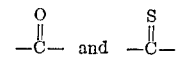

linkages along the polymer chain. It has been found that these linkages need not, and frequently do not, occur in regular alternating sequences along the polymer chain although the sulfurization process does result in approximately equal numbers of each.

The polymeric complexes of the invention have been charactrized as comprising a polyoxathiahydrazide of the formula

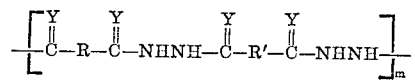

wherein R and R', Y and m are set forth as hereinbefore. These polyoxathiahydrazides may be described as consisting essentially of the above units in that small amounts, i.e., up to 10% by weight, of other recurring units not conforming to that formula may be included by the use of approximate comonomeric constituents. For example, in the initial condensation reaction to produce the polyhydrazide, small amounts of hydrazine may be replaced by reactive difunctional compounds such as ethylene glycol, ethylene diamine, N,N'-dimethylhydrazine or the like. For the most parts, however, such copolymeric units are to be avoided as the melting point of a polythiadiazole article, which also would then comprise a copolymer, will be undesirably lower than that of the homopolymer. The polyoxathiahydrazides of the polymeric complexes can usually give self-supporting films at somewhat lower molecular weights than most synthetic polymers, e.g., even with inherent viscosities of 0.1 as measured in methanesulfonic acid at 30° C. However a polymeric complex with a low inherent viscosity in methanesulfonic acid may have a much higher inherent viscosity in other solvents. A reduction in molecular weight frequently occurs upon going from the polyhydrazide to the polyoxathiahydrazide, possibly a result of partial chain degradation. Monovalent terminal groups in the polyoxathiahydrazide molecules may be of an infinite variety, e.g., organic radicals, —OH, —H, phosphorus and sulfur derivatives, etc., and do not appreciably affect the properties of the polymer.

The following examples are illustrative of the practice of this invention. Parts and percentages therein are by weight unles otherwise specified.

In the examples, values of inherent viscosity ($\eta_{inh}$) are determined in accordance with the following equation:

$$\eta_{inh} = \frac{\ln(\eta_{rel})}{(C)}$$

The relative viscosity ($\eta_{rel}$) may be determined by dividing the flow time in a capillary viscometer of a dilute solution of the polymer by the flow time for the pure solvent. The concentration (C) used in the examples is 0.5 gram of polymer per 100 ml. of solution and the measurements are made at 30° C. The solvents employed for viscosity measurements are indicated in the examples.

As used herein, the "polymer melt temperature," abbreviated "PMT," is defined as that temperature at which a polymer sample leaves a molten trail when moved across a hot metal surface under moderate pressure. Infrared spectra were obtained as films, nujol mulls, or KBr discs on Perkin-Elmer spectrophotometers (models 221 and 521); ultraviolet spectra were obtained on samples in methanesulfonic acid vs. methanesulfonic acid alone on a Cary model 14 spectrophotometer. Fluorescent studies in film- or fiber-form, or in methanesulfonic acid solution, were observed in a Mineralab Fluorescence cabinet, using long wavelength ultraviolet light. Hexamethylphosphoramide (HMPA) was distilled from calcium hydride and frequently was chromatographed through neutral alumina under nitrogen immediately before use. Dimethyl sulfoxide (DMSO) was distilled from and subsequently stored over calcium hydride. Methanesulfonic acid (MSA) was stored in amber bottles and used as received. All condensation polymerizations were run under an atmosphere of dried nitrogen and polymerization flasks and auxiliary glassware were initially dried at 105° C. under vacuum. Commercially available phosphorus pentasulfide, supplied by the manufacturer in wax-sealed bottles, was employed for the sulfurization-complexation reactions with the polyhydrazides.

Fiber properties of tenacity, elongation and initial modulus are coded as T/E/Mi and are reported in their conventional units of g./den., percent, and g./den., respectively; denier is coded as den.; work-to-break is coded as WTB and is reported in g./den.; work recovery and tensile recovery at various elongations, coded as WR and TR, are reported in percent. Boiled-off tensile properties are reported after 40 min. at the boil.

Thermogravimetric analysis (TGA) thermograms which provide the TGA data presented herein for the various polymers were obtained on the Du Pont 950 Thermogravimetric Analyzer. These analyses were carried out in a slow stream of nitrogen at a programmed rate of temperature rise of 10° C. per minute.

Example I

Part A. Preparation of polymeric complex.—An intimate mixture of 20.0 g. poly(isophthaloyl hydrazide) of $\eta_{inh}=0.76$ (DMSO), 160 g. (0.7 mole) of phosphorous pentasulfide, and 750 ml. of anhydrous pyridine is prepared at room temperature and is heated to reflux with stirring, under nitrogen. Reflux is continued for the balance of the reaction period which totals 30 minutes. The reaction mixture is then allowed to cool to ambient temperature while stirring, after which the precipitated yellow mass is allowed to settle before removal of the bulk of the supernatant pyridine by decantation. The residual solid mass is then placed in 1,000 ml. of hot water and digested on a steam table for 1 hour at aboit 80°–90° C. The digested solid mass is broken into small fragments which are homogenized in water in a blendor. The solid is again isolated by filtration, washed with separate quantities of water and methanol, and air dried on a vacuum funnel. The yellow complexed poly(isophthaloyl oxathiahydrazide) thus isolated, 61 g., PMT=375° C. (dec.), $\eta_{inh}=0.54$ (pyridine) 1.54 (DMAc); 0.12 (MSA), exhibits characteristic infrared bands at 6.83–7.1, 13.5, 14.0, and 14.75$\mu$. The complex exhibits a $\lambda_{max}$ at 324 m$\mu$ in its U.V. absorption spectrum versus methanesulfonic acid. Pyridine in the complex is indicated by absorptions at 250 m$\mu$ in the U.V. spectrum. Clear yellow-amber films are readily cast from both pyridine and N,N-dimethylacetamide solutions containing about 40% solids.

Part B. Preparation of fibers from the polymeric complex.—A quantity of complexed poly(isophthaloyloxathiahydrazide) is dissolved in pyridine to form a spinning solution containing 60% solids. This solution is extruded at 50–60 p.s.i. at the rate of about 2.3 ml. per minute through a spinneret having 5 holes of 0.005 inch (0.13 mm.) diameter into a drying column whose walls are kept at a temperature of about 185° C. The column is swept with a co-current stream of dry nitrogen which enters the column at about 182° C. at a rate of about 5 cubic feet/minute. The emerging filaments, which have a dog-bone structure, are wound up at the rate of about 125 yd./min. The as-extruded filaments (T/E/Mi=0.7/171.2/16.6)

give the following $\eta_{inh}$ values: 0.73 (pyridine); 1.52 (DMAc); 0.45 (MSA). The thermogravimetric analysis surve of these filaments shows a gradual weight loss with changes in slope at 152° C. and 325° C. (level); the first major break occurs at 463° C. (conversion to 1,3,4-thiadiazol-2,5-ylene units); and 71% weight loss occurs to 721° C.

The undrawn filaments so prepared are heated in air from 100°–260° C. over 1 hour to effect decomplexing and conversion to the polythiadiazole. The brown filaments thus produced, $\eta_{inh}=0.80$ (MSA), have infrared bands at 6.0–6.3, 6.9–7.3 (multiplet), 12.5, 16.3, and 20.5$\mu$; $\lambda_{max}=320-324$ m$\mu$, shoulders at 330 and 340 m$\mu$ (fluoresces).

In a more vigorous treatment, the undrawn filaments are heated from 150°–250° C. over 2 hours then from 250°–325° C. over 1 hour, and are maintained at 325° C. for 0.5 hour. The filaments have spectral properties similar to those given in the preceding paragraph; T/E/Mi=0.6/8.3/17.8.

Part C. Preparation of films from the polymeric complex.—A film of the polymer of Part A cast from pyridine and heated under the conditions of the preceding paragraph, produces a clear, dark amber film of poly(m-phenylene 1,3,4-thiadiazol-2,5-ylene) which has spectral and fluorescent properties similar to those exhibited by the filaments described in that paragraph.

Part D. Polyoxathiahydrazide by direct condensation.—To a stirred solution of 30.1 g. (0.155 mole) of isophthaloyl dihydrazide in 300 ml. of hexamethylphosphoramide, maintained at 0° C., are added 40.0 g. (0.155 mole) of dimethyl tetrathioisophthalate. The stirred reaction mixture is maintained at 0° C. for 3 hours, at 25° C. for an additional 24 hours, and at 65° C. for an additional 48 hours. The reaction mixture is then poured into water to precipitate the polymer which is subsequently removed, homogenized in a blendor with water, and collected by filtration. The precipitate of poly(isophthaloyl-oxathiahydrazide) is washed with successive quantities of water, methanol, acetone, and ether. The polymer is dried at ambient temperature to obtain 34.2 g. of pink-buff product, PMT=360° C., $\eta_{inh}=0.15$ (MSA). The infrared spectrum of this polymer shows bands at 2.9–3.2, 5.9–6.1, 7.0, 9.3–9.4, 13.5, 14.0, and 14.8$\mu$. The polymer is insoluble in pyridine and is composed of recurring units of the formula

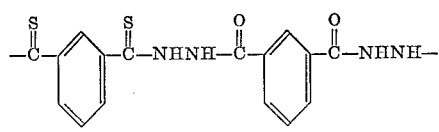

Part E. Spectral and TGA comparisons.—

| Product | Infrared Absorption in Microns ($\mu$) | | | $\lambda_{max.}$ Spectrum in Microns ($\mu$) | TGA Temperature Data [1] °C./° C. | |
|---|---|---|---|---|---|---|
| | | | | | $(T_i/T_f)_1$ | $(T_i/T_f)_2$ |
| A. Complex (Unconverted) | 13.5 | 14.0 | 14.75 | 324 | 152/325 | 463/721 |
| D. Condensation (Unconverted) | 13.4 | 14.0 | 14.7 | 314 | 190/285 | 450/590 |
| A. Complex (Converted) | 16.3 | 19.0 | | 320–324 | 460/580 | |
| D. Condensation (Converted) | 16.3 | 19.0 | | 315 | 460/580 | |

[1] Unconverted polymer samples show two abrupt changes upon heating, the $(T_i/T_f)_1$ in going to the polythiadiazole and the $(T_i/T_f)_2$ as the polythiadiazole decomposes. Heating of the last two (or converted) samples gives only a single abrupt change, i.e. a $(T_i/T_f)_1$ as decomposition occurs.

Example II

Part A. Preparation of Polymeric complex.—To an inimate mixture of 20.0 g. of poly(iso/terephthaloylhydrazide) (50:50 copolymer) having an $\eta_{inh}$ of 3.2 in dimethyl sulfoxide and 160 g. (0.71 mole) of phosphorous pentasulfide are added 750 ml. of anhydrous pyridine. The stirred reaction mixture is heated to reflux and is maintained thereat for the balance of the reaction period, 30 minutes overall. It is then cooled, with stirring, to ambient temperatures and is allowed to stand overnight. After the supernatant pyridine is subsequently removed, the orange-colored solid residue is placed in an excess of water and is digested on a steam bath at 65°–70° C. for 3 hours, after which it is homogenized in a blendor. The polymer is filtered, washed, several times with separate quantities of hot water and methanol, and dried, first at ambient temperatures for 16 hours, than at 115° C. in a vacuum oven for 0.5 hour. The granular complexed copoly(iso/-terephthaloyloxathiahydrazide) polymer weighs 47.2 g., PMT>390° C. and is soluble in pyridine, N-N-dimethylacetamide, hexamethylphosphoramide, methanesulfonic acid, and N-methylpyrrolidone. A clear, creasable film is cast from a 98% pyridine solution containing about 30% solids. The film, dried at room temperature, shows 2.8–3.0, 5.9, 6.0–6.35, 7.0, 8.9–9.4, 13.8, 14.3, and 14.8$\mu$ infrared absorption bands and exhibits an $\eta_{inh}$ of 3.07 (DMAc). The polymer has a $\lambda_{max.}$ of 320 m$\mu$ vs. MSA and exhibits feeble fluorescence (vs. MSA) to long wave length ultraviolet light.

Part B. Preparation of fibers from the polymeric complex.—A 45 g. quantity of the complexed copoly(iso-terephthaloyloxathiahydrazide) is dissolved in 44 ml. of 98% pyridine, using shear-stirring, to form a spinning solution containing 51% solids. After a trace of undissolved solid material is removed from this viscous, amber solution by centrifugation, the solution is extruded at the rate of about 3.5 ml./min. through a spinneret having 5 holes of 0.005 inch (0.13 mm.) diameter into a drying column whose walls are kept at a temperature of about 180° C. The column is swept with a co-current stream of dry nitrogen which enters the column at 265° C. at a rate of 5 cubic feet/minute. The emerging yarn, which has a dog-bone structure, is wound up at the rate of about 100 yd./min. The yarn is plied to 20 filament yarn after back winding. The orange-colored as-extruded complexed copoly(iso/terephthaloyloxathiahydrazide) yarn exhibits the following tensile properties: Den. T/E/Mi/WTB, 11.02/0.45/167/15.9/0.63. Tensile properties exhibited by a yarn sample subsequently drawn 4× at 150° C. over a 3-ft. plate are: Den. T/E/Mi/WTB, 3.35/1.75/25.2/30.8/0.303. The TGA thermogram of a yarn sample drawn 3× at 200° C. exhibits an initial break or $(T_i T_f)_1$ at 175° C.–200° C.; the second break or $(T_i/T_f)_2$ begins at 462° C.

Part C. Preparation of films from the polymeric complex.—A quantity of copoly(iso/terephthaloyloxathiahydrazide), prepared by the general procedure of Part A but having an $\eta_{inh}$ of 1.84 (DMSO), is dissolved in 98% pyridine to form a 30% solution from which a film is cast. The strong, clear, creasable, amber copoly(iso/terephthaloyloxathiahydrazide) film is heated at 250° C./0.5 mm. for 20 hours to form an integral, clear, dark amber copoly(meta-/para-phenylene - 1,3,4-thiadiazole) film which is stable to heating at temperatures in excess of 400° C. An infrared spectrum of the as-cast film shows the typical spectrum of the oxathiahydrazide. The converted film shows no carbonyl band at 5.8–6.0$\mu$ and shows thiadiazole bands at 16.3 and 21.0$\mu$. The converted film exhibits strong fluorescence in dilute methanesulfonic acid solution and exhibits a $\lambda_{max.}$ at 350 m$\mu$ in methanesulfonic acid.

Part D. Polyoxathiahydrazide by direct condensation.—To a solution of 3.0 g. (0.0133 mole) of terephthaloyl dithiahydrazide in 75 ml. of hexamethylphosphoramide, maintained at 25° C., are added 2.7 g. (0.0133 mole) of isophthaloyl chloride. The resulting orange-red solution is stirred at 25° C. for 24 hours at a 60° C. for an additional 48 hours. The resulting polymer is isolated and worked up as described in Part D of Example I. There is thereby obtained a 3.8 g. yield of amber poly(iso/terephthaloyl oxathiahydrazide), PMT=348° C. $\eta_{inh}$=0.31 (MSA). The polymer exhibits feeble fluorescence as is typical of the oxathiahydrazide, has a $\lambda_{max.}$ at 330 m$\mu$, and has an infrared spectrum with bands at 13.5, 14.1, and 14.7$\mu$. The polyoxathiahydrazide is pyridineinsoluble and is composed of recurring units of the formula

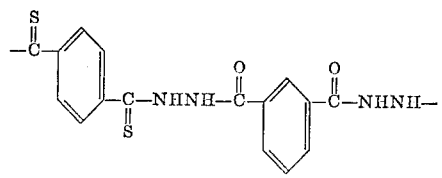

Part E. Spectral and TGA comparisons.—

| Product | Infrared Absorption in Microns ($\mu$) | | | $\lambda_{max.}$ of U.V. Spectrum in Microns ($\mu$) | TGA Temperature Data, °C./° C. | |
|---|---|---|---|---|---|---|
| | | | | | $(T_i/T_f)_1$ | $(T_i/T_f)_2$ |
| A. Complex (Unconverted) | 13.8 | 14.3 | 14.8 | 320 | 175/250 | 462/605 |
| D. Condensation (Unconverted) | 13.5 | 13.95 | 14.7 | 330 | 185/290 | 460/610 |
| A. Complex (Converted) | 16.2 | 20.0 | | 350 | 460/580 | |
| D. Condensation (Converted) | 16.3 | 21.0 | | 342 | 450/590 | |

Example III

The procedure of Example I is repeated using as a starting material a polyhydrazide whose recurring units have the formula

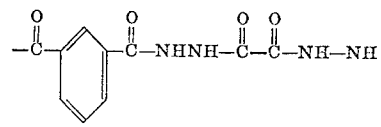

The $\eta_{inh}$ of this starting polyhydrazide is 0.14 (DMSO). The resulting polymeric complex corresponding thereto has a PMT>375° C. and can be formed into films from pyridine solution. The polythiadiazole in turn formed therefrom has a PMT of 284° C. and an $\eta_{inh}$ of 0.14 (DMSO). Spectral and TGA values of these polymers as compared to the corresponding polyoxathiahydrazide prepared by direct condensation and its thiadiazole polymer are given below. The formula of the recurring units in the polyoxathiahydrazide condensation polymer, $\eta_{inh}$ of 0.1 (MSA), PMT of >375° C. is as follows:

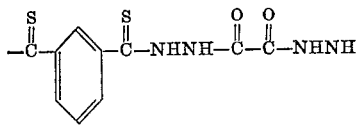

SPECTRAL AND TGA COMPARISONS

| Product | Infrared Absorption in Microns ($\mu$) | $\lambda_{max}$ of U.V. Spectrum in Microns ($\mu$) | TGA Temperature Data, °C./°C. | |
|---|---|---|---|---|
| | | | $(T_i/T_f)_1$ | $(T_i/T_f)_2$ |
| A. Complex (Unconverted) | 13.4  14.0  14.8 | 308 | 195/260 | 360/520 |
| D. Condensation (Unconverted) | 13.7  14.05  14.8 | 315–324 | 196/260 | 360/520 |
| A. Complex (Converted) | 16.3  20.9 | 321–329 | 350/510 | |
| D. Condensation (Converted) | 16.2  20.9 | 323–330 | 350/510 | |

Example IV

The procedure of Example I is repeated using as a starting material a polyhydrazide whose recurring units have the formula

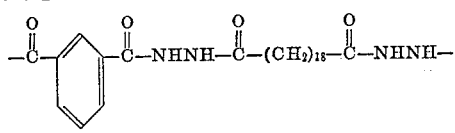

The $\eta_{inh}$ of the starting polyhydrazide is 0.30 (DMSO). The resulting polymeric complex corresponding thereto has a PMT of 318° C. and can be formed into films from pyridine solution. The polythiadiazole in turn formed therefrom has a PMT>375° C. Spectral and TGA values of these polymers as compared to the corresponding polyoxathiahydrazide prepared by direct condensation and its thiadiazole polymer are given below. The formula of the recurring units in the polyoxathiahydrazide condensation polymer, $\eta_{inh}$ of 0.19 (MSA), PMT of 150° C. (dec.) is as follows

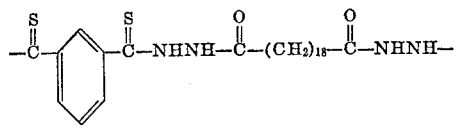

SPECTRAL AND TGA COMPARISONS

| Product | Infrared Absorption in Microns ($\mu$) | $\lambda_{max}$ of U.V. Spectrum in Microns ($\mu$) | TGA Temperature Data, °C./°C. | |
|---|---|---|---|---|
| | | | $(T_i/T_f)_1$ | $(T_i/T_f)_2$ |
| A. Complex (Unconverted) | 13.4  14.0  14.8 | 270 | 185/275 | 360/490 |
| D. Condensation (Unconverted) | 13.75  14.0  14.7 | 322 | 185/280 | 360/480 |
| A. Complex (Converted) | 16.2  20.9 | 273–284 | 360 | 490 |
| D. Condensation (Converted) | 16.2  21.5 | 262–274 | 360/520 | |

Examples V–XIV

In the following Table I are shown properties of representative complexed polyoxathiahydrazide and poly-(1,3,4-thiadiazole) polymers prepared according to the processes of this invention. The complexed polyoxathiahydrazides are prepared by the process of Example I herein from the appropriate polyhydrazide precursor represented by formula $$-\left\{\begin{matrix}O & O & O & O \\ \| & \| & \| & \| \\ C-R-C-NHNH-C-R'-C-NHNH \end{matrix}\right\}_p$$

In each complexed polyoxathiahydrazide product, two of the four carbonyl groups per recurring formula unit of the reactant polyhydrazide are randomly converted to thiocarbonyl groups. The poly(1,3,4-thiadiazole) products corresponding to the formula $$\left(R-\underset{N-N}{\overset{S}{\diagup\diagdown}}-R'-\underset{N-N}{\overset{S}{\diagup\diagdown}}\right)_n$$

are obtained from their complexed polyoxathiahydrazide predecessors by thermally-induced cyclodehydration of the latter. For the poly(1,3,4-thiadiazole) species of Examples V–IX and XII–XIV this is acomplished by heating the appropriate polymeric complex under the conditions of Example I-B (last paragraph). The poly(1,3,4-thiadiazole) products of Examples X and XI are obtained by heating the appropriate polyoxathiahydrazide complex from 150°–350° C. over a 3 hour period, followed by isothermal heating at 350° C. for 0.5 hour. Unless otherwise noted in Table I, viscosities of the polyhydrazides were measured in DMSO and those of the complexed polyoxathiahydrazides and poly(1,3,4-thiadiazoles) were measured in MSA. Other solvents used, including those used to cast films, are identified in the legend.

TABLE I

| Example | Poly(hydrazide) | | | Complexed poly(oxathiahydrazide) | | | Poly(1,3,4-thiadiazole) | | Complexed Poly(oxathiahydrazide) $\lambda_{max}$ (m$\mu$) | Poly(1,3,4-thiadiazole) $\lambda_{max}$ (m$\mu$) |
|---|---|---|---|---|---|---|---|---|---|---|
| | R | R' | $\eta_{inh}$ | PMT, °C. | $\eta_{inh}$ | Film | PMT, °C. | $\eta_{inh}$ | | |
| V | ⌬ | ⌬–⌬ | 0.06 | 302 | 0.19 | B | 300 | 0.26 | ¹ 295–320 | 312 |
| VI | ⌬ | ⌬ | 0.63 | >375 | 0.10 | B | >375 | 0.70 | 275 | 270–275 |

TABLE I—Continued

| Example | Poly(hydrazide) R | Poly(hydrazide) R' | η_inh | Complexed poly(oxathiahydrazide) PMT, °C | η_inh | Film | Poly(1,3,4-thiadiazole) PMT, °C | η_inh | Complexed Poly(oxathiahydrazide) λ_max (mμ) | Poly(1,3,4-thiadiazole) λ_max (mμ) |
|---|---|---|---|---|---|---|---|---|---|---|
| VII | phenyl | pyridyl | 0.14A | 302 | | B | >375 | 0.24 | 312–316 | 284 |
| VIII | phenyl | pyridyl | 0.35 | >375 | 0.48 | B | >375 | 0.56 | ² 295,307 | 312 |
| IX | phenyl | dichlorophenyl | 0.19 | >375 | 0.17B | B | >375 | 0.28 | 312 | 320 |
| X | phenyl | —(CH₂)₄— | 1.86 | >375 | 0.23 | | >375 | | ² 275,320 | ² 257–282,310 |
| XI | phenyl | Bond | 0.23A | >375 | 0.30 | C | >375 | 0.14 | 260, 300 | ¹ 300–313 |
| XII | chlorophenyl | chlorophenyl | 0.10 | >375 | 0.19 | B | >375 | 0.28 | ¹ 300 | 335 |
| XIII | cyclohexyl | cyclohexyl | 0.17 | >375 | 0.19 | | >375 | 0.35 | 254 | ¹ 330 |
| XIV | —(CH₂)₄— | —(CH₂)₄— | 0.10A | 284 | 0.10 | | >375 | 0.93 | 220 | ¹ 256 |

¹ Envelope.   ² Shoulder.
LEGEND.—A. Methanesulfonic acid.  B. Pyridine.  C. N,N-dimethylacetamide.

In Table II are tabulated characteristic infrared absorption bands and thermogravimetric analysis (TGA) data for complexed poly(oxathiahydrazide) polymers and the corresponding data for the poly(1,3,4-thiadiazole) polymers obtained therefrom. The various temperatures listed under $(T_i/T_f)$ have been taken from the TGA curves obtained from the respective species, $T_i$ representing the lower temperature at which a rapid loss of weight begins and $T_f$ the higher temperature at which the curve again smooths out. In the complexed poly(oxathiahydrazide) section, the temperatures listed under $(T_i/T_f)_1$ are those temperatures, read from the TGA curve, between which the respective polymers are cyclodehydrated to the corresponding poly(1,3,4-thiadiazole) species. Temperatures listed under $(T_i/T_f)_2$ in this section are the corresponding temperatures between each resulting poly(1,3,4-thiadiazoles) decompose, the data being obtained by continuously heating the complexed poly(oxathiahydrazide) to effect formation of the poly(1,3,4-thiadiazole) and the subsequent decomposition of the latter. In the poly(1,3,4-thiadiazole) section of Table I, the $(T_i/T_f)_1$ entries are those temperatures between which other poly(1,3,4-thiadiazole) samples decompose, these samples having been previously obtained by separate cyclodehydration of their precursors obtained through the process of this invention.

The TGA behavior patterns of the complexed poly(oxathiahydrazides) and poly(1,3,4-thiadiazoles) prepared by the process of this invention compare favorably with those reported by Frazer and Sarasohn in Polymer Preprints, 5, No. 1, 114 (1964), for the related poly(hydrazides) and poly(1,3,4-oxadiazoles). It is to be noted, however, that the poly(oxathiahydrazides) prepared by the process of the instant invention are converted with greater ease to the corresponding poly(1,3,4-thiadiazoles) (i.e., converted at lower temperatures) than are the poly(hydrazides) to the resultant poly(1,3,4-oxadiazoles)

TABLE II

| Example | Complexed Poly (Oxathiahydrazide) Infared Absorption in Microns (μ) | | | TGA Temp. Data °C./° $(T_i/T_f)_1$ | TGA Temp. Data °C./° $(T_i/T_f)_2$ | Complexed Poly(1,3,4-Thiadiazole) Infared Absorption in Microns (μ) | | | TGA Temp. Data, °C./°C. $(T_i/T_f)_1$ |
|---|---|---|---|---|---|---|---|---|---|
| V | 13.4 | | 14.5 | 14.8 | 175/290 | 450/590 | 16.2 | | 20.5 | | 450/610 |
| VI | | 14.1 | 14.75 | 175/285 | 380/500 | 16.2 | | 20.5 | | 350/490 |
| VII | 13.4 | 14.6 | 14.9 | 180/275 | 450/600 | | 17.2 19.1 20.5 | | 460/590 |
| VIII | 13.4 | 14.0 | 14.8 | 175/280 | 456/585 | 16.2 | 19.3 | | 440/590 |
| IX | 13.4 | 14.0 | 14.8 | 180/275 | 440/595 | | | 20.5 | | 450/590 |
| X | 13.4 | 14.0 | 14.8 | 195/260 | 380/480 | | 19.5 | 21.0 | |
| XI | 13.4 | 14.0 | 14.8 | 180/290 | 360/520 | 16.2 | | 20.5 21.0 | 350/510 |
| XII | | 13.8 | 14.4 | 14.8 | 175/290 | 450/600 | 16.2 | | 20.5 | | 460/610 |
| XIII | 13.4 | 14.3 | 14.8 | 180/250 | 381/499 | 16.2 | | 20.9 | | 380/485 |
| XIV | 13.4 | | 14.8 | 160/281 | 360/490 | 16.2 | | 21.5 | 360/480 |

Example XV

This example illustrates the importance of limiting the duration of the sulfurization and complexation reaction.

To an intimate mixture of 20.0 g. of poly(iso-/terephthaloylhydrazide) ($\eta_{inh}$ of 1.65 of dimethylhyldisulfoxide) and 160 g. (0.71 mole) of phosphorus pentasulfide are added 750 ml. of anhydrous pyridine. The stirred reaction mixture is heated to reflux and is maintained at reflux for the balance of the reaction period, 45 minutes overall. The reaction mixture is then cooled to ambient temperatures to precipitate a solid product. The supernatant liquid is decanted and the solid residue is placed in water and digested on a steam bath for 1 hour at 80°–90° C. The material is then homogenized in a blender, filtered, and washed with separate quantities of methanol and water. The product is dried according to the procedure of Example II–A herein. While the product is spectrally typical of the copoly(oxathiahydrazides) prepared using shorter reaction times, since it displays infrared absorption bands at 13.4, 14.0 and 14.7$\mu$, it is only slightly soluble in pyridine. The material lacks sufficient solubility in pyridine to enable the spinning of fibers or the casting of films therefrom.

In contrast to this, reactions which are run under the same conditions as described except that the reaction times are 40 minutes and 35 minutes, respectively, yield pyridine-soluble products. Solutions of these products can be spun into fibers and cast to form films.

Example XVI

This example illustrates that pyridine-soluble complexed poly(oxathiahydrazides) are obtained when the sulfurization-complexation process of this invention is carried out for periods as brief as one minute. These products, while in film form, are thermally converted to the corresponding polythiadiazole.

A reaction vessel containing a stirred mixture of 30 g. of poly(iso/terephthaloylhydrazide), (50/50; $\eta_{inh}$=2.14 in DMSO), 270 g. (1.2 mole) of phosphorus pentasulfide, and 1,100 ml. of pyridine, maintained under nitrogen, is immersed in a preheated oil bath (160° C.) immediately after the mixture is prepared. Reflux is attained very rapidly. An aliquot sample (100 ml.) is removed from the reaction vessel at the onset of reflux and other aliquots are removed at minute intervals thereafter until a total of fourteen aliquots are taken. The separate aliquots are cooled, separated and digested according to the procedure of Example I. The products thus obtained are dissolved in pyridine to form solutions containing about 30% solids which are then cast in films. The integral, self-supporting films, dried at room temperature, all exhibit the 13.5–15.0$\mu$ (triplet) absorption in the infrared characteristic of complexed poly(oxathiahydrazides). These films, after being heated under the conditions of Part C of Example I, exhibit the 20.0$\mu$ infrared absorption characteristic of the 1,3,4-thiadiazol-2,5-ylene linkage. Additional properties of these films are shown in Table III.

TABLE III

| | Aliquot Removal Data | Film Data | |
|---|---|---|---|
| No. | Removal Time, Minutes After Onset of Reflux | As Cast: Thickness (mil.) | Converted: $\eta_{inh}$ (in MSA) |
| 1 | 0 (at reflux) | 0.1 | 0.67 |
| 2 | 1 | 0.09 | 0.80 |
| 3 | 2 | 0.12 | 0.66 |
| 4 | 3 | 0.07 | 0.54 |
| 5 | 4 | 0.12 | 0.73 |
| 6 | 5 | 0.05 | 0.86 |
| 7 | 6 | 0.06 | 0.81 |
| 8 | 7 | 0.06 | 0.40 |
| 9 | 8 | 0.07 | 0.35 |
| 10 | 9 | 0.05 | 0.21 |
| 11 | 10 | 0.03 | 0.08 |
| 12 | 11 | 0.03 | 0.40 |
| 13 | 12 | 0.10 | |
| 14 | 13 | 0.05 | |

Examples XVII–XXI

The data in following Table IV demonstrates the excellent thermal stability of fibers obtained from copoly(meta-/para-phenylene-1,3,4-thiadiazoles) prepared by the process of this invention, as evidenced by their retention of tensile properties after prolonged exposure in high temperature atmospheres. These data were obtained after exposing fibers (in skein form) in ovens under the conditions indicated in the section coded "Exposure." The copoly(meta-/para-phenylene-1,3,4-thiadiazole) filaments of Examples XVII–XXI were obtained from the corresponding polymeric complex precursors by the general extrusion and conversion procedures of Example I–B. The latter polymeric complexes were prepared by the general procedure of Example I–A.

TABLE IV

| Example | Fiber Treatment Prior To Exposure | Pre-Exposure Tensile Properties | | | Atmosphere | Temp., ° C. | Time, Hours | Post-Exposure Tensile Properties | | |
|---|---|---|---|---|---|---|---|---|---|---|
| | | T | E | Mi | | | | T | E | Mi |
| XVII | Drawn 4X at 250° C | 1.85 | 24.3 | 41.2 | (¹) | 300 | 144 | 1.7 | 5.5 | 67.2 |
| XVIII-A | Drawn 4.2X at 250° C | 2.1 | 13.7 | 68.7 | (¹) | 245 | 1 | 1.9 | 9.5 | 67.3 |
| XVIII-B | Exposed fiber of Ex. XVIII-A | 1.9 | 9.5 | 67.3 | (²) | 400 | 24 | 1.1 | 3.7 | 51.3 |
| XIX | Drawn 4.55X at 250°–300 °C.³ | 2.37 | 11.0 | 61.3 | (¹) | 200 | 24 | 1.51 | 5.2 | 69.9 |
| XX | Drawn 4.55X at 250°–300° C.³ | 2.37 | 11.0 | 61.3 | (¹) | 400 | 32 | 1.5 | 4.6 | 63.47 |
| XXI-A | Drawn 4.55X at 250°–300° C.³ | 2.37 | 11.0 | 61.3 | (¹) | 200–400 | 2 | | | |
| XXI-B | Exposed fiber of Ex. XXI-A | | | | (¹) | 400 | 32 | 1.9 | 8.0 | 36.8 |

¹ Air.
² Nitrogen.
³ 3.5X at 250° C., 1.3X at 300° C.

Example XXII

In following Table V are illustrated the beneficial effects of various post-drawing treatments performed upon separate samples of copoly(meta-/para-phenylene-1,3,4-thiadiazole) fiber prepared by the process of this invention. The initial fiber samples, prepared by the general process of Example II, had received a total post-extrusion draw of 3.5×, the maximum drawing temperature being 375° C., prior to receiving the separate after-treatments indicated.

TABLE V

| EXAMPLE | After Treatment | After-Treatment Initial T/E/Mi | Tensile Properties Boiled Off T/E/Mi |
|---|---|---|---|
| XXII | None | 1.1/4.5/51.6 | 2.0/10.5/65.7 |
| XXII-A | Live Steam/hr./atmospheric pressure. | 2.05/11.8/70.5 | 1.92/12.2/54.5 |
| XXII-B | Immersion in refluxing pyridine/48 hr. | 2.15/16.8/55.9 | 2.19/16.4/59.0 |
| XXII-C | Fiber of XXII-A (initial) Immersed in refluxing pyridine for 2.5 hours. | 1.86/11.7/57.8 | 2.32/14.1/58.1 |

Example XXIII

The data in following Table VI illustrates that stepwise drawing, converting, and thermally decomposing the as-extruded fibers prepared by the process of this invention produces poly(1,3,4-thiadiazole) fibers of enhanced tensile properties. In contrast to fibers obtained in this way, poly(1,3,4-thiadiazole) fibers obtained by single-stage drawings at temperatures sufficient to cause conversion of the complexed poly(oxathiahydrazide) fibers to the poly(1,3,4-thiadiazole) are shown to exhibit inferior tensile properties. The contrasting results of Table VI are observed after subjecting as-extruded complexed poly-(iso-/terephthaloyloxathiahydrazide) fibers of Example II–B to the drawing conditions indicated. In Table VI fibers drawn at or below 200° C. are completely unconverted and exhibit relatively high elongations.

TABLE VI

| Example XXIII | Fiber Treatment: Draw; Boiled Off (BO) | Fiber Tensile Properties | | | |
|---|---|---|---|---|---|
| | | T | E | MI | WTB |
| A | As-extruded (Ex. II–B) | 0.45 | 167.0 | 15.9 | 0.630 |
| | Boiled Off | 0.58 | 6.2 | 17.4 | 0.024 |
| B | 3X at 125° C | 1.03 | 75.8 | 23.9 | 0.601 |
| | Boiled Off | 1.06 | 86.8 | 21.4 | 0.642 |
| C | 4X at 150° C | 1.75 | 25.2 | 30.8 | 0.303 |
| | Boiled Off | 1.46 | 90.8 | 22.0 | 0.851 |
| D | 3X at 200° C | .88 | 47.8 | 23.6 | 0.333 |
| | Boiled Off | 1.35 | 92.0 | 31.3 | 0.889 |
| E | 3X at 225° C | 0.74 | 47.0 | 21.4 | 0.287 |
| | Boiled Off | 1.34 | 70.8 | 37.1 | 0.729 |
| F | 3X at 275° C | 0.65 | 21.4 | 20.8 | 0.117 |
| | Boiled Off | 1.01 | 32.8 | 26.4 | 0.278 |
| G | 3X at 300° C | 0.65 | 14.0 | 21.5 | 0.074 |
| | Boiled Off | 0.86 | 20.2 | 16.3 | 0.135 |
| H | 3X at 350° C | 0.52 | 6.0 | 17.1 | 0.020 |
| | Boiled Off | 0.65 | 14.7 | 9.3 | 0.065 |
| I | 3X at 375° C | 0.47 | 6.6 | 13.5 | 0.020 |
| | Boiled Off | 0.57 | 18.8 | 4.7 | 0.066 |
| J | 3X at 250 °C | 1.52 | 5.8 | 46.5 | 0.058 |
| | 1.35X at 250° C Total 4.05X. | 1.85 | 24.3 | 41.2 | 0.314 |

Examples XXIV–XXIX

The variations in post-extrusion fiber-drawing, converting, and decomplexing techniques which have previously been exemplified may be performed in combination with still other variable features to produce strong, thermally-stable poly(1,3,4-thiadiazole) fibers and yarns. For example, the aforementioned treatments may be performed upon fibers obtained from complexed oxathiahydrazide polymers and copolymers whose post-preparative treatments included a period of aging (with or without stirring) in the cooled reaction mixture prior to digestion. The as-extruded complexed poly- and copoly(oxathiahydrazide) filaments may themselves be aged prior to receiving further processing.

Following Table VII illustrates these aging processes for complexed poly(iso-/terephthaloyloxathiahydrazide) polymers and fibers prepared from their poly(iso-/terephthaloylhydrazide) (50/50) precursors by the general procedures of Example II (digestion period was 1 hr. at 80°–90° C.). In Table VII, the column headed "$\eta_{inh}$, Polyhydrazide" indicates the inherent viscosity of the starting reactant, measured in DMSO; the column headed "Drawing and Converting Conditions" describes the processes by which drawn poly(meta-/para-phenylene-1,3,4-thiadiazole) fibers are obtained from their polymeric complex intermediates; tensile properties reported are filament properties of 30 filament yarns, and are boiled-off values; all filament ageings were performed on bobbins in air at ambient temperatures; drawing and converting were accomplished on heated curved plates having 1.5 ft. (linear) contact surface and affording a yarn residence time of 5 sec. per unit length. As a measure of the improvement of tensile properties in the resultant poly-(1,3,4-thiadiazole) filament, it may be noted that the complexed poly(iso/terephthaloyloxathiahydrazide) filaments treated as shown in Example XXIV exhibited the following tensile properties after ageing on the bobbin: T/E/Mi/WTB: 0.55/124.5/18.0/0.64, prior to conversion and drawing.

TABLE VII

| Example | $\eta_{inh}$. Poly-(hydrazide) | Polymer Ageing Period, Hr. | Fiber Ageing Period, Hr. | Drawing and Converting Conditions | Total Draw | Tensile Properties, Poly-(1,3,4-thiadiazole) Filaments | | | |
|---|---|---|---|---|---|---|---|---|---|
| | | | | | | T | E | Mi | WTB |
| XXIV | 2.7 | (¹) | 96 | 3.5X at 250° C.; 1.2X at 275° C.; 1.03X at 300° C | 4.33X | 3.5 | 14.4 | 78.1 | 0.32 |
| XXV | 1.8 | 64 | 24 | 3.0X at 200° C.; 1.4X at 225° C.; 1.2X at 350° C.; 1.05X at 395° C–400° C. | 5.3X | 1.4 | 8.3 | 34.1 | 0.07 |
| XXVI | 1.8 | 64 | 48 | 3.5X at 200° C.; 1.4X at 240° C.; 1.1X at 270° C.; 1.07X at 300° C. | 5.75X | 1.7 | 8.2 | 53.0 | 0.09 |
| XXVII | 1.8 | 64 | 72 | 3.5X at 200° C.; 1.1X at 200° C.; 1.3X at 250° C.; 1.05X at 295° C. | 5.2X | 1.41 | 9.9 | 33.1 | 0.096 |
| XXVIII | 1.7 | 94 | 24 | 2.0X at 150° C.; 1.2X at 200° C.; 1.2X at 225° C.; 1.1X at 275° C.; 1.03X at 300° C. | 3.5X | 1.9 | 10.3 | 57.0 | 0.14 |
| XXIX | 1.7 | 94 | 24 | 2.0X at 200° C.; 1.2X at 225° C.; 1.2X at 250° C.; 1.03X at 300° C.; 1.05X at 400° C. | 3.12X | 1.8 | 8.8 | 60.3 | 0.11 |

¹ None.

As many widely different embodiments of this invention may be made without departing from the spirit and scope thereof, it is to be understood that this invention is not to be limited to the specific embodiments thereof except as defined in the appended claims.

What is claimed is:

1. A process for producing pyridine-soluble poly(oxathiahydrazides) comprising heating to a temperature of at least 100° C. a mixture of $P_2S_5$, a solvent comprising at least 90% by weight of pyridine, and a polyhydrazide of the formula

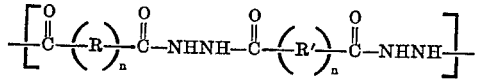

wherein
$n$ is 0 or 1,
R and R' are divalent organic radicals containing no more than about 20 carbon atoms and being selected from the group consisting of saturated aliphatic, aromatic, and cycloaliphatic radicals which may have halogen substituents and which may contain ether and thioether linkages, and heterocyclic radicals in which the hetero atoms are oxygen, sulfur and nitrogen,
said polyhydrazide starting material having an inherent viscosity in dimethyl sulfoxide at 30° C. of at least 0.2; the duration of said heating being such that said mixture is exposed to temperatures of 100° C. or more for no more than 40 minutes, and thereafter recovering the poly(oxathiahydrazide) thusly formed.

2. Process according to claim 1 wherein the heating is carried out under reflux in an inert gas atmosphere.

3. Process according to claim 1 wherein the amount of $P_2S_5$ employed is at least 3 times that theoretically required to replace all of the carbonylic oxygens of said polyhydrazide with sulfur.

4. Process according to claim 1 wherein said pyridine solvent contains water.

5. Process according to claim 1 wherein said pyridine solvent contains hexamethylphosphoramide.

6. Process according to claim 1 wherein said poly(oxathiahydrazide) is separated by cooling and filtration or centrifugation.

7. Process according to claim 6 wherein poly(oxathiahydrazide) is subsequently digested in aqueous medium at temperatures of 60° C. to 100° C.

8. Process for producing a shaped article of a poly (1,3,4-thiadiazole) by first forcing a pyridine-soluble poly(oxathiahydrazide) in accordance with the process defined in claim 1, producing a shaped article therefrom, then heat treating the shaped article to convert the poly (oxathiahydrazide) to a poly(1,3,4-thiadiazole).

9. Process according to claim 8 wherein the shaped article is a spun fiber.

10. Process according to claim 9 wherein the spun poly(oxathiahydrazide) fiber is drawn to at least 1.1× its as-spun length and the resulting poly(1,3,4-thiadiazole) fiber is further drawn to at least 2× said as-spun length.

11. A poly(oxathiahydrazide) product produced in accordance with claim 1, said product having an inherent viscosity in methane-sulfonic acid at 30° C. of at least 0.1.

12. A poly(oxathiahydrazide) product as defined in claim 11 in the form of a film.

13. A poly(oxathiahydrazide) product as defined in claim 11 in the form of a filament.

14. A poly(oxathiahydrazide) product as defined in claim 11 wherein R and R' are each aromatic.

15. A poly(oxathiahydrazide) product as defined in claim 11 wherein R is m-phenylene and R' is p-phenylene.

16. A poly(oxathiahydrazide) product as defined in claim 11 wherein R and R' are each m-phenylene.

17. A poly(oxathiahydrazide) product as defined in claim 11 wherein R and R' are each p-phenylene.

18. An extruded filament of the poly(oxathiahydrazide) of claim 11, said filament having been drawn to at least 1.1× its as-spun length.

19. A poly(oxathiahydrazide) product as defined in claim 15, said product having a polymer melt temperature of greater than 390° C. and exhibiting a $\lambda_{max}$ at 320 m$\mu$ versus methane-sulfonic acid in its ultraviolet absorption spectrum.

References Cited

FOREIGN PATENTS 1,134,080    8/1962    Germany.
133,731    3/1962    Germany.

JULIUS FROME, *Primary Examiner.*